UNITED STATES PATENT OFFICE.

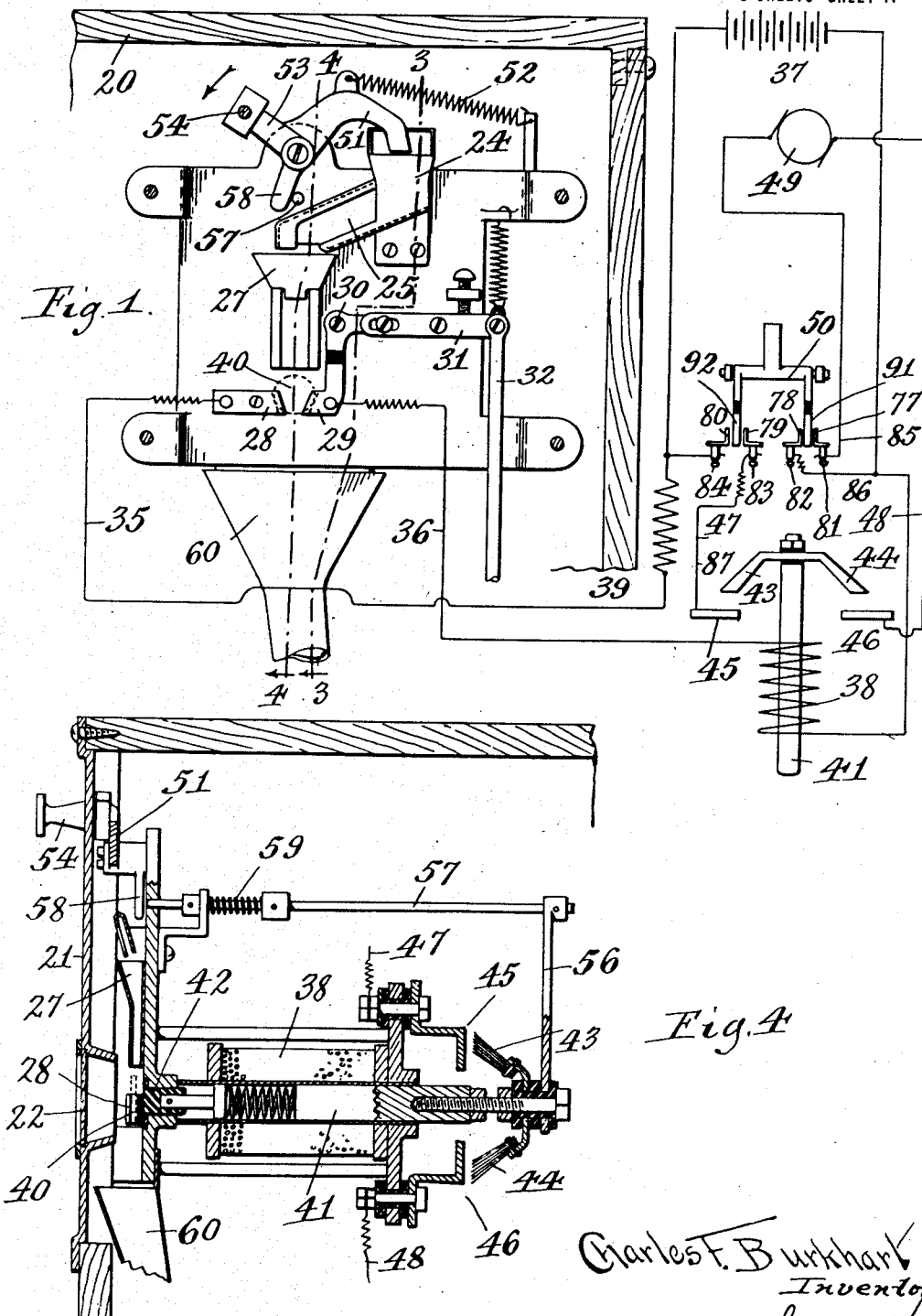

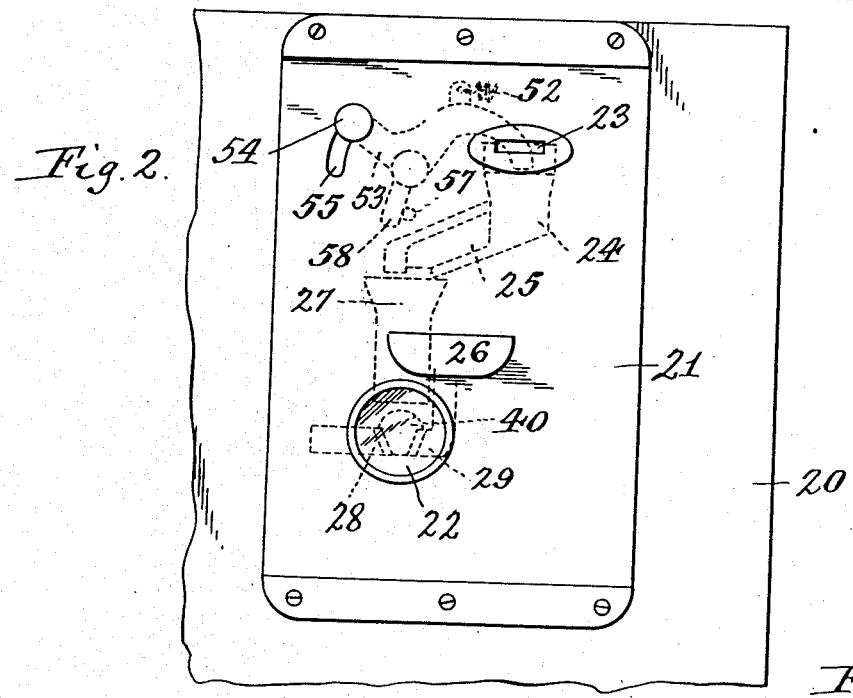
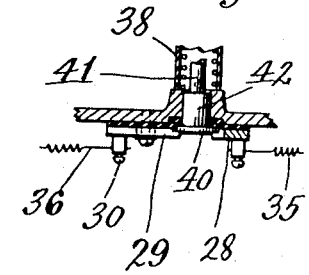
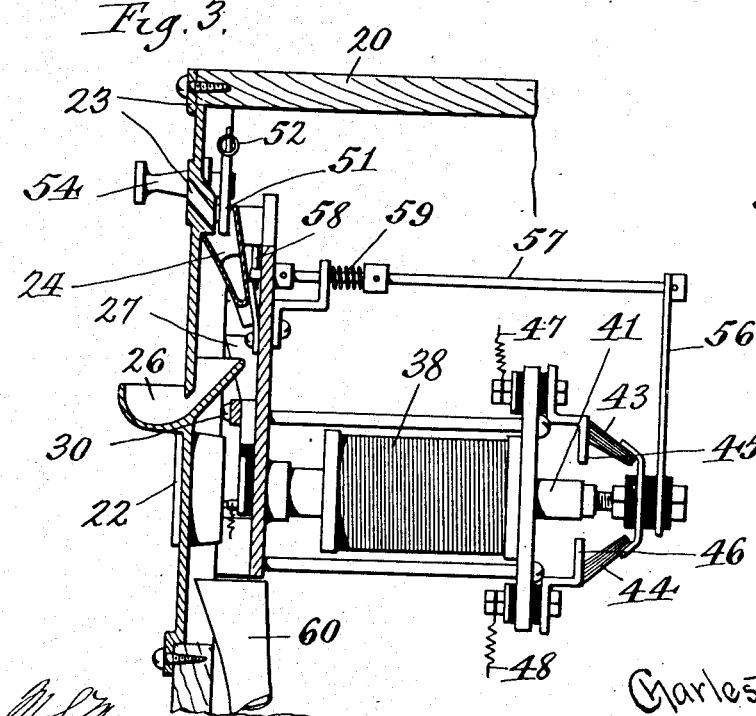

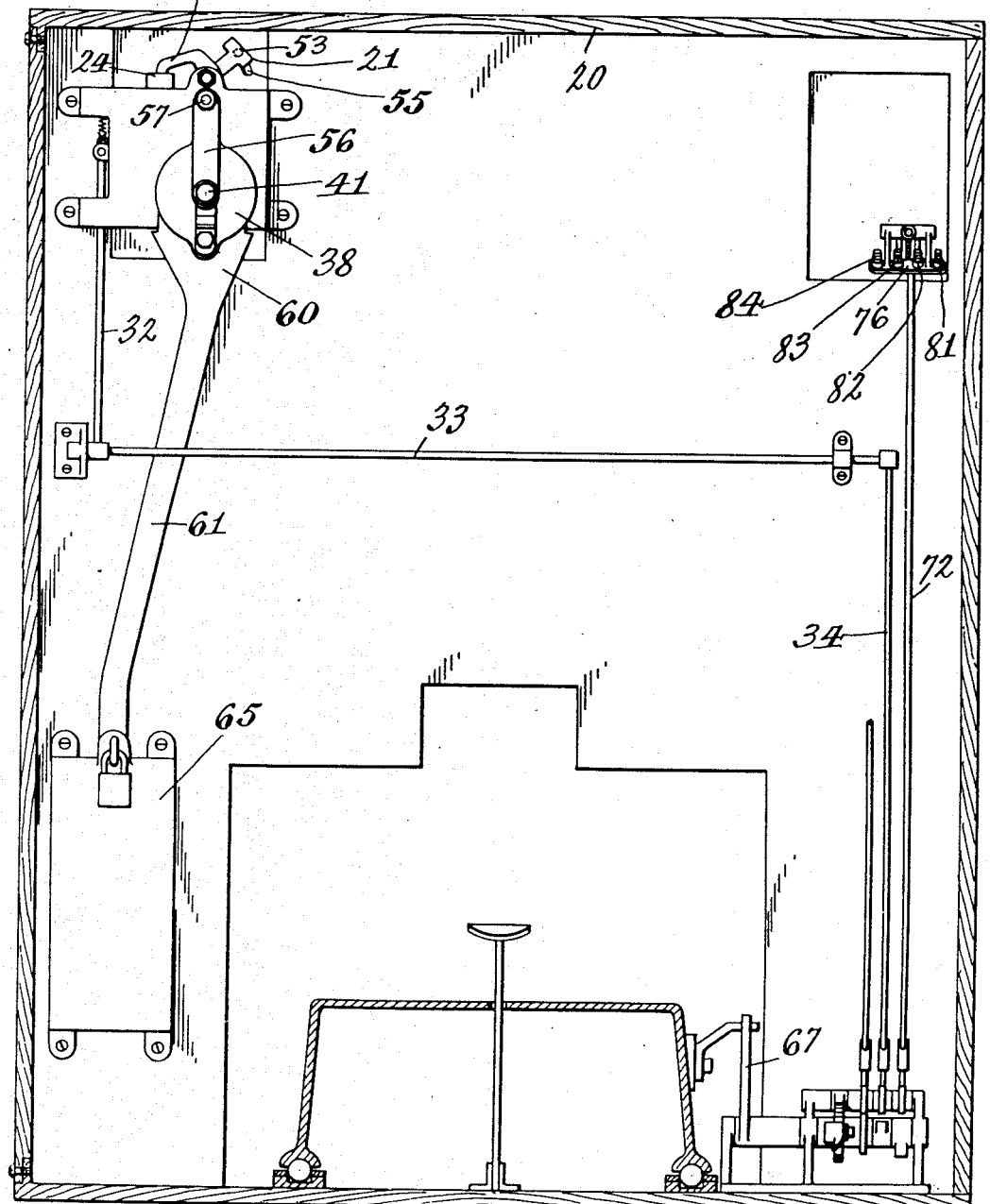

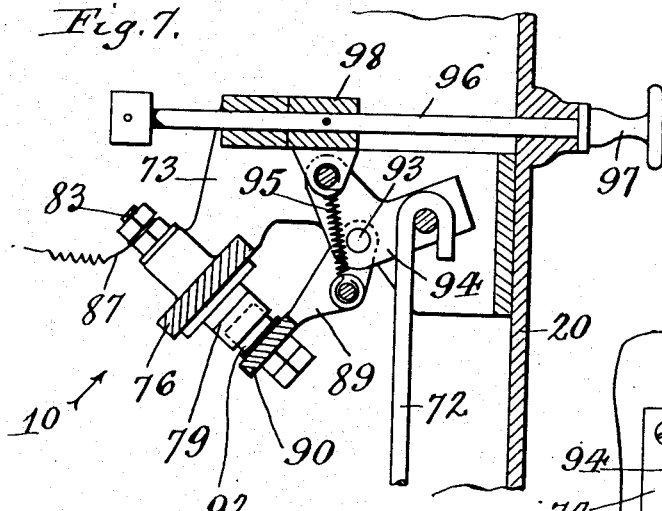
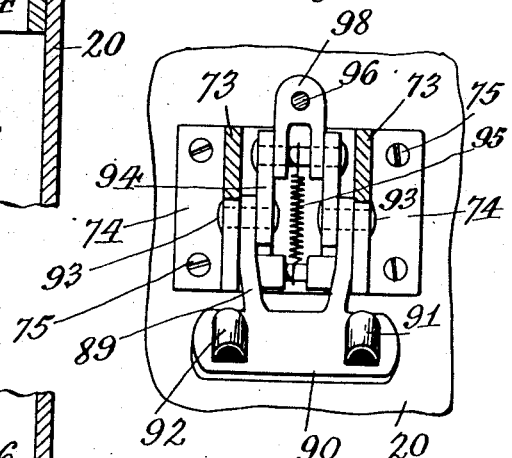
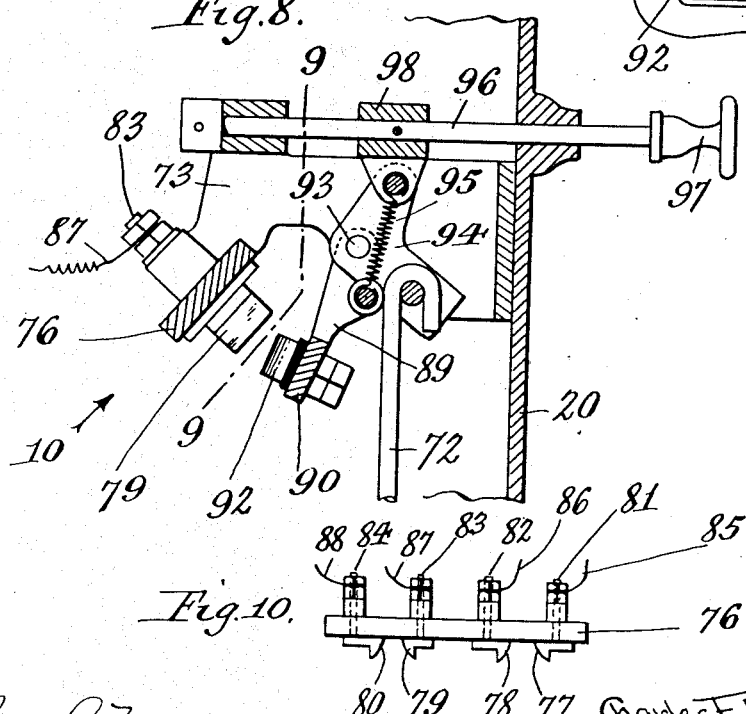

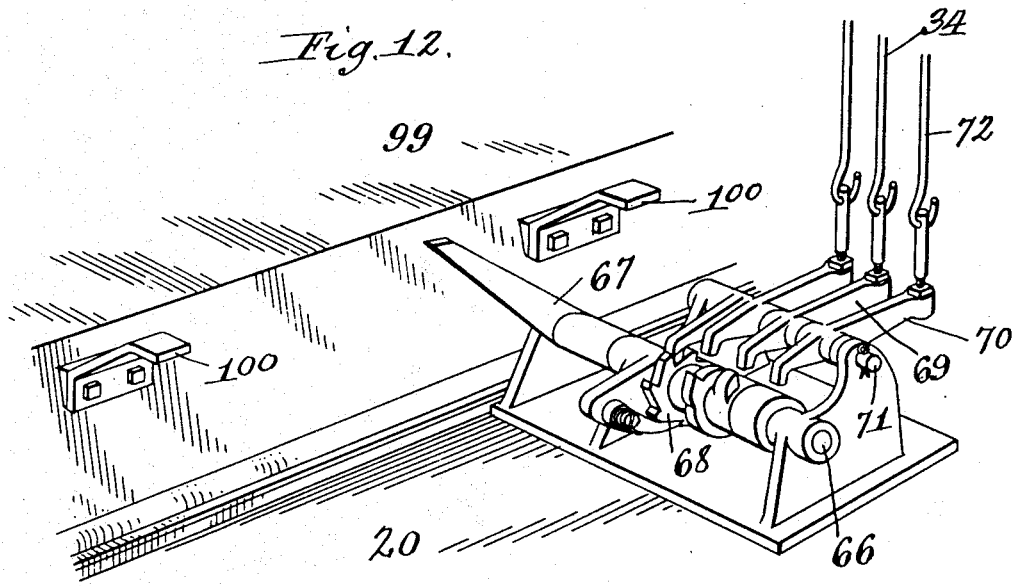
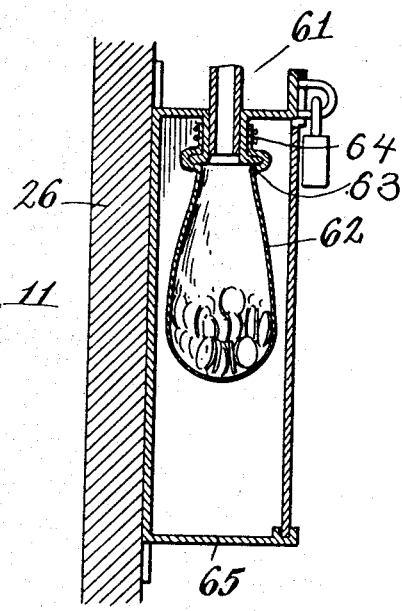

CHARLES F. BURKHART, OF BUFFALO, NEW YORK, ASSIGNOR TO BURKHART AUTOMATIC SHOE POLISHING MACHINE COMPANY, OF BUFFALO, NEW YORK, A CORPORATION OF NEW YORK.

COIN-CONTROL MECHANISM.

1,180,236.

Specification of Letters Patent. Patented Apr. 18, 1916.

Application filed January 25, 1911, Serial No. 604,663. Renewed June 18, 1915. Serial No. 34,963.

*To all whom it may concern:*

Be it known that I, CHARLES F. BURKHART, a citizen of the United States, residing at Buffalo, in the county of Erie and State of New York, have invented certain new and useful Improvements in Coin-Control Mechanisms; and I do hereby declare the following to be a full, clear, and exact description of the invention, such as will enable others skilled in the art to which it appertains to make and use the same.

This invention relates to coin control mechanisms and has for an object to provide a coin control for use in association with the shoe dressing machine and the shoe dressing delivering mechanism which forms the subject matter of co-pending applications, filed January 24th, 1911.

A further object of the invention is to provide coin receiving contacts with electrically operated means controlled by the closing of such circuit through the coin for actuating means for holding the coin more firmly in position.

A further object of the invention is to provide improved means for shunting a fraction of the motor current through the coin for actuating a solenoid switch for controlling the supply of energy to the motor.

A further object of the invention is to provide a coin chute with means for closing said chute and manually operable means for removing the closure of the chute and mechanical means for locking the closure in a closed position at other times.

A further object of the invention is to provide an improved form of manually operated switch for restarting the motor after it has once been stopped by a mechanical means.

A further object of the invention is to connect the said coin controlling mechanism with the timing mechanism which forms the subject matter of the co-pending applications above referred to.

With these and other objects in view the invention comprises certain novel constructions, combinations and arrangement of parts as will be hereinafter more fully described and claimed.

In the drawings: Figure 1 is a view of the coin receiving chute and contacts with the front plate removed. Fig. 2 is a view of the front of the plate showing in dotted lines the coin chute and showing in full lines the manual control and the sight opening. Fig. 3 is a view in vertical section as on line 3—3 of Fig. 1. Fig. 4 is a vertical sectional view taken on line 4—4 of Fig. 1. Fig. 5 is a detail sectional view showing the contacts and solenoid coin engaging member. Fig. 6 is a vertical sectional view through the casing showing the coin control apparatus in rear elevation. Fig. 7 is a view of the manually and mechanically operated switch closed. Fig. 8 is a view of the manually and mechanically operated switch opened. Fig. 9 is a sectional view of the switch taken on line 9—9 of Fig. 8. Fig. 10 is a view in elevation as indicated by arrow 10 at Figs. 7 and 8. Fig. 11 is a view in vertical section of the lower end of the coin chute, the coin receptacle and the receiving bag hung upon the end of the coin chute. Fig. 12 is a perspective view of the timing mechanism.

Like characters of reference designate corresponding parts throughout the several views.

The improved coin control mechanism which forms the subject matter of this application is adapted for use in connection with the shoe dressing and shoe dressing delivering mechanisms described in the co-pending applications above referred to but is not limited in its scope to such use and is operable with other mechanisms and for other purposes.

The mechanism is contained in a housing 20 and preferably secured to the front thereof and provided with a plate 21 which in turn is provided with a sight opening 22. At Fig. 2 the housing is shown with the plate 21 in position while at Fig. 1 the housing is shown with the plate removed disclosing the coin control mechanism. The plate 21 is provided with a slot 23 communicating with the coin chute 24 which is provided with any of the well known means for discharging coins other than that required, as for instance, the open side indicated at 25, whereby the coin when smaller than the right denomination in physical area is dropped from such opening into the cup 26 in position to be retrieved by the party depositing.

If the coin is of the right physical size it drops into a hopper 27 which directs the coin to drop between the contacts 28 and 29 which are visible through the sight opening 22. The contact 29 is pivoted as at 30 to swing and is controlled by a lever 31 and rod 32 which extends to the rock shaft 33 which in turn is controlled by a rod 34 extending to the timing mechanism which will be hereinafter more fully described.

The contacts 28 and 29 are in circuit through the lines 35 and 36 with the source of electrical energy indicated as 37 and also passes about the coil 38 of a solenoid. A resistance 39 is introduced into the circuit leading to the contacts 28 and 29 so that only a fraction of the motive force from the source of energy 37 passes to such contacts. The introduction of a coin indicated at 40 between the contacts 28 and 29 will therefore energize the coil 38 to move the movable core 41 of the solenoid. The core is provided with an insulating extremity 42 positioned to engage against the sides of the coin 40 and hold such coin firmly in engagement with the contacts 28 and 29 to prevent sparking and burning out the coin. It has been found by experience that unless the coin can be held into firm engagement with the contacts the sparking eventually burns out the coin and renders the coin worthless. The core 41 also carries brushes 43 and 44 positioned for engagement respectively with contacts 45 and 46 when the core has been moved to position to clamp the coin as above described. The contacts 45 and 46 are respectively connected by means of lines 47 and 48 with the source of electrical energy 37 and also with the motor indicated diagrammatically at 49 by use of which the mechanism is operated. Introduced into the lines 47 and 48 is a switch indicated as a whole at 50 and which will be hereinafter more fully described.

The coin chute 24 is provided with a slot through which a curved arm 51 extends so that when the arm 51 extends into and across the chute a coin cannot be introduced through the slot 23. The arm 51 is held yieldingly to closed position by the spring 52 and is provided with a lever arm 53 which has a knob or other convenient means for manipulating indicated at 54 extending through a slot 55 in the front plate 21 in position to be grasped by the hand of the party operating.

When a coin is introduced into the slot 23 it is held back by the arm 51. If now the lever 55 is manipulated by depressing the knob 54 the arm 51 is raised from the chute to permit the coin to pass. The spring promptly returns the arm to position and as soon as the coin touches the contacts 28 and 29 the solenoid is energized to clamp such coin in position and to close the contacts consisting of brushes 43 and 44 and contact members 45 and 46. The core 41 also carries an arm 56 which is rigidly secured to a rod 57 positioned to engage behind a finger 58 carried by the arm 51 so that when the solenoid is actuated the arm 51 is locked into the chute and retained in such position until the solenoid is deënergized and the core and arm returned by the spring 59.

When the cycle of operation has been completed the timing mechanism shown at Fig. 11 raises the rod 32 and moves the contact 29 to release the coin 40 and also to open the switch shown at Figs. 7, 8 and 9 to deënergize the motor and the solenoid. From the contacts 28 and 29 the coin drops to the hopper 60 and through the chute 61 to a bag 62 suspended upon the lower end of the chute by means of the chute being formed with an enlarged head 63 about which the bag is tied as indicated at 64. The chute 61 extends into a casing 65 which is locked or otherwise secured as may be required or desired and as indicated at Figs. 6 and 10. The object of suspending the bag upon the lower end of the chute is that when the collector makes his round the bag and all its contents may be bodily removed from the chute and given the proper number or designating identifying mark whereby the contents of such bag and the amount which the machine has earned can be later determined as desired.

The timing mechanism above referred to is more fully disclosed in the aforesaid copending applications and comprises a shaft 66 carrying a plurality of cams and actuated by a lever 67 and ratchet mechanism 68. A plurality of levers 69 and 70 are pivoted as at 71, to the former of which levers the rod 34 extends while the latter carries a rod 72 which extends upwardly to and operates the switch 50.

The switch shown as a whole at 50 comprises a bracket 73 composed of spaced arms secured to the casing 20 in any approved manner as by the flanges 74 and screws 75. The bracket 73 carries a cross-piece 76 upon which are spaced a plurality of contact members 77, 78, 79 and 80 connected respectively with binding posts 81, 82, 83 and 84 to which are respectively connected lines 85, 86, 87 and 88. Pivoted to the bracket 73 is a U-shaped member 89 carrying a cross-bar 90 which is provided with contacts 91 and 92, the former of which is adapted to close the circuit between the contacts 77 and 78 and the latter to close the circuit between the contacts 79 and 80. The U-shaped member 89 is pivoted as at 93 and at such pivot is also arranged a bell crank lever 94 carrying a spring 95 positioned and proportioned to draw across the pivot 93 as the bell crank lever is changed from the position shown at Fig. 7 to that shown at Fig. 8 to actuate the U-shaped member 89 to open and close the switch instantaneously.

To actuate the bell crank lever 94 a plunger 96 is provided extending outwardly through the housing 20 and carrying a handle or knob 97 by which the same may be manually operated. The plunger 96 carries a block 98 rigidly secured to such plunger and pivoted to one leg of the bell crank lever 94 whereby the reciprocations of the plunger 96 serve to move such bell crank lever to actuate the U-shaped member and consequently open and close the switch as indicated. To the other leg of the bell crank lever is also pivotally connected the rod 72 which extends downwardly to the lever 70 of the timing mechanism. It is apparent, therefore, that as the timing mechanism is operated from any approved source, as the reciprocations of the carriage, shown diagrammatically at 99, the abutments 100 will oscillate the lever 67 to operate the timing mechanism and thereby to operate the switch. In the continued operation of the mechanism when combined with the shoe dressing and shoe dressing delivering mechanisms above referred to it is desirable at all times to operate the switch manually and for that purpose the manual control is also applied.

I claim:—

1. In a coin control mechanism, a circuit including spaced contacts positioned to receive a coin one of said contacts being movable, means to hold the movable contact yieldingly in coin-retaining positions, means to mechanically hold the coin in firm engagement with the contacts and means actuated from the closed circuit for breaking the circuit.

2. In a coin control mechanism, a circuit embodying spaced contacts one of which is movable, means to hold the movable contact yieldingly in coin-retaining position, a coin chute directed to deliver coin to the spaced contacts, means for holding a coin firmly in engagement with the contacts, a motor having an electric circuit, means actuated by the holding means for closing the circuit to the motor and means actuated by the motor for breaking the circuit.

3. In a coin control mechanism, spaced contacts one of which is movable, means for delivering a coin upon and to bridge the space between the contacts, electrically controlled means for holding the coin firmly in engagement with the contacts and electrically controlled means for releasing such engagement.

4. In a coin control mechanism, an open electric circuit embodying spaced contacts one of which is movable, means for delivering a coin upon and to bridge the space between the contacts, a solenoid introduced into the circuit provided with a movable core adapted to hold the coin in firm engagement with the contacts, and electrically actuated means for breaking the circuit and releasing the coin.

5. In a coin control mechanism, an open circuit embodying spaced contacts one of which is movable, means to deliver a coin upon and to bridge the space between the contacts, a solenoid introduced into the circuit, a movable core for the solenoid, means carried by the movable core adapted to engage the coin and hold it in firm engagement with the contacts and electrically actuated means for moving the movable contact to release the coin.

6. In a coin control mechanism, spaced contacts one of which is movable, means to deliver a coin upon and to bridge the space between the contacts, a solenoid, a movable core carried by the solenoid, means carried by the core adapted to engage and hold the coin in engagement with the contacts, an electric circuit embracing the contacts and the solenoid, a motor circuit, means carried by the solenoid for closing the motor circuit and means actuated by the motor for breaking both circuits.

7. In a coin control mechanism, an electric circuit embodying spaced contacts, means to deliver a coin upon and to bridge the space between the contacts, a solenoid introduced into the circuit, a movable core actuated by the solenoid, means carried by the core for engaging the coin and holding it in firm engagement with the contacts, a motor, a motor circuit, a switch controlling both circuits and means actuated by the motor for opening the switch.

8. In a coin control mechanism, a circuit embodying spaced contacts, means to deliver a coin upon and to bridge the space between the contacts, a solenoid introduced into the circuit, a movable core actuated by the solenoid, means carried by the core for engaging and holding the coin in engagement with the contacts and means to manually break the circuit.

9. In a coin control mechanism, a circuit embodying spaced contacts one of which is movable, means to deliver a coin upon and to bridge the space between the contacts, a solenoid introduced into the circuit, a movable core actuated by the solenoid, means carried by the core for engaging and holding the coin in firm engagement with the contacts and means to break the circuit and move the movable contact to release the coin.

10. In a coin control mechanism, a coin chute, a movable arm extending into and across the chute, contacts positioned to receive a coin from the chute, a circuit embodying the contacts closed by the introduction of a coin, a solenoid introduced into the circuit and means carried by the solenoid for locking the arm in chute closing position.

11. In a coin control mechanism, a coin chute, a movable arm extending into and to close the chute, contacts positioned to receive the coin from the chute, a circuit embodying the contacts and closed by the coin, a solenoid introduced into the circuit, a movable core actuated by the solenoid, means carried by the core for holding the coin in firm engagement with the contacts and means carried by the solenoid for locking the arm in chute closing position.

12. In a coin control mechanism, a coin chute, a pivoted arm, means to hold the arm yieldingly in chute closing position, means to facilitate the manual moving of the arm out of chute closing position, contacts positioned to receive a coin from the chute, an electric circuit embodying the contacts and closed by the coin, a solenoid introduced into the circuit, a movable core actuated by the solenoid, means carried by the core for holding the coin firmly in engagement with the contacts and a rod carried and movable by the core and adapted to lock in the rear of movement of the pivoted arm to lock such arm in chute closing position.

13. In a coin control mechanism, a coin chute, coin receiving contacts located adjacent the extremity of the chute one of said contacts being movable, means to pass a current of electricity through the contacts and the coin, and means engaging the side of the coin for holding the coin in intimate relation with the contacts.

14. In a coin control mechanism, a coin chute, coin receiving contacts adjacent the extremity of the chute one of which contacts is movable, means to pass a current of electricity through the contacts of the coin, and means actuated by the electric current for exerting added tension upon the side of the coin to press the coin into more intimate relation with the contacts.

15. In a coin control mechanism, a coin holder, a plunger positioned to engage the side of the coin, a switch having a stem in alinement with the plunger, a spring interposed between the plunger and the switch stem, and means to actuate the switch.

In testimony whereof I affix my signature in presence of two witnesses.

CHARLES F. BURKHART.

Witnesses:
ROBT. T. LANG,
L. L. MORRILL.